United States Patent [19]
Sawyer et al.

[11] Patent Number: 5,313,974
[45] Date of Patent: May 24, 1994

[54] PIPELINE PRESSURE RELEASE APPARATUS AND METHOD

[75] Inventors: Elmer E. Sawyer, Bowling Green; Sanford Glover, Bartow; Wayne Alderman, Mulberry, all of Fla.

[73] Assignee: Impacto Enterprises, Inc., Bartow, Fla.

[21] Appl. No.: 14,825

[22] Filed: Feb. 3, 1993

[51] Int. Cl.⁵ .................................................. 251 332
[52] U.S. Cl. ............................... 137/12; 137/516.25; 137/529; 137/543
[58] Field of Search .................................. F16K 15/02

[56] References Cited

U.S. PATENT DOCUMENTS

| | | | |
|---|---|---|---|
| 716,864 | 12/1902 | Casey | 137/529 |
| 2,443,851 | 6/1948 | Corcoran | 137/543 |
| 2,770,443 | 11/1956 | Rand | 251/333 |
| 4,413,688 | 11/1983 | Seabourn | 137/529 X |
| 4,485,843 | 12/1984 | Wolff | 137/529 X |
| 5,052,435 | 10/1991 | Crudup | 251/332 X |

FOREIGN PATENT DOCUMENTS 2202247 1/1972 Fed. Rep. of Germany ...... 137/529

Primary Examiner—Robert G. Nilson
Attorney, Agent, or Firm—George A. Bode; Michael L. Hoelter

[57] ABSTRACT

A pressure release apparatus for relieving pressure that may occur within a pipeline due to water hammers or the like. This apparatus is secured to the pipeline directly in line with the pressure wave and consists of a spool piece having an opening therethrough which is selectively biased in the closed position. When pressure within the pipeline is sufficient to overcome this bias, the opening is unblocked thereby permitting such pressure to be released to the atmosphere. A blast shield surrounds this opening so that the sudden release of such pressure will not cause damage to surrounding people or property.

17 Claims, 5 Drawing Sheets 5,313,974

PIPELINE PRESSURE RELEASE APPARATUS AND METHOD

BACKGROUND OF THE INVENTION

1. Field of the Invention

This invention pertains to an apparatus for releasing potentially damaging pressure which may occur within a pipeline and more particularly to an apparatus for releasing the pressure resulting from water hammers before such pressure can cause damage to a pump or the like connected to the pipeline.

2. General Background

In long pipeline systems where one or more booster pumps are needed to deliver fluid across great distances, water hammers will occur. A water hammer is a change in pressure within the pipeline, either above or below the normal pressure, caused by a variation of the flow rate in the pipeline. Every time the flow rate is changed, either increased or decreased, a water hammer is developed. Normally, in small diameter pipes with low flows, the stresses created are not critical. However, in larger pipelines with relatively high flow rates, the stresses created can be significant enough to damage downstream equipment, including booster pumps.

Water hammers are a function of the momentum of the fluid in the pipeline, such momentum being equal to the mass of the fluid times its velocity. Whenever a change in this momentum occurs, such as by closing a valve or otherwise altering the flow rate of the fluid, such a change will cause pressure to build-up which is transmitted along the pipe. In some cases, this pressure will rise until it is large enough to overcome the momentum of the fluid thereby bringing the fluid in the pipe to a standstill, thus initiating a water hammer. At the instant such a pressure wave reaches a reservoir or the like, the fluid in the pipe is motionless but at a pressure much higher than normal. Consequently, this difference in pressure between the pipe and the reservoir will cause the fluid in the pipe to rush into the reservoir thereby reducing the pressure within the pipe. However, at the time the pressure within the pipe reaches normal levels, the fluid has attained considerable momentum out of the pipe. Thus, a negative pressure is created within the pipe which will eventually cause the fluid to stop flowing into the reservoir and reverse its direction back into the pipe. As the fluid flows back into the pipe, pressure within the pipe increases to above normal levels thereby creating significant forces that, if not diffused, may damage surrounding equipment. This cycle of high and low pressure build-up will normally continue to occur until friction dampens these oscillations or until such pressure is released by a rupture of the pipe or the like. Because of the high velocity of the pressure waves involved, each cycle may take only a fraction of a second to occur.

Usually, it is uneconomical to design long pipelines to withstand the pressures that are created by water hammers. Additionally, it is oftentimes not economical to operate valves slowly enough such that a water hammer is not created in the first place. To thus compensate for the water hammers that are created in long pipelines, a surge tank is oftentimes coupled to the pipeline close to valves at the end of the pipeline. Consequently, when a valve is suddenly operated, the water in the pipe will flow either into or out of the surge tank thereby dampening any pressure build-up that may occur. Unfortunately, however, for the surge tank to operate effectively, it generally must be open to atmospheric pressure, thus the pipeline can only be pressurized up to the amount of head provided by the surge tank. Additionally, installing multiple surge tanks in long runs will significantly increase the cost of the pipeline. A typical surge tank system is shown by U.S. Pat. No. 4,652,222 to Aiba.

Other potential solutions to the water hammer problem are shown by U.S. Pat. No. 1,776,937 to Timbs, et al. and U.S. Pat. No. 2,752,754 to Jaseph. Unfortunately, these devices provide only a fixed volume into which the pressure can be released, thus in large diameter pipelines, should more volume be needed to relieve the pressure, these devices will not be sufficient.

In pneumatic systems, typical pressure relief systems are shown by U.S. Pat. No. 1,952,916 to Etten and U.S. Pat. No. 4,177,023 to Kamiya, et al. These devices, by pertaining to pneumatic systems, are not suitable for liquids flowing through the pipeline because such liquids may cause blockage or otherwise interfere with the seals in these devices. These inventions also suffer as a result of the limited volume provided for relief purposes.

It is thus an object of this invention to provide an apparatus for relieving the pressure that may occur due to water hammers. Another object of this invention is to provide an unlimited volume into which such pressure can be released thereby avoiding the restrictions imposed upon previously known devices. Still another object of this invention is to provide an apparatus that can be adapted to both small and large diameter pipelines. Yet another object of this invention is to provide pressure relief which can be adjusted, as needed, to accommodate the various equipment that may be installed or will be installed along the pipeline. Still another object of this invention is to provide pressure relief without the need for surge tanks such that the pipeline may be pressurized for greater flow therethrough. A further object of this invention is to provide such pressure relief at low cost and with an apparatus that require little maintenance. These and other objects of this invention will become obvious upon further investigation.

SUMMARY OF THE PRESENT INVENTION

The preferred embodiment of the apparatus of the present invention solves the aforementioned problems in a straight forward and simple manner. What is provided is a pipeline pressure release apparatus that incorporates a spool piece connected to the pipeline. This spool piece has an opening therethrough sized for pressure release and is vented to the atmosphere. A face plate assembly is secured to the spool piece with this face plate assembly normally blocking the opening in the spool piece. Biasing means are included which bias the face plate assembly against the spool piece thereby blocking the opening in the spool piece. To control the biasing means, an adjustment assembly is incorporated which can adjust the bias of the biasing means whereby when pressure against the face plate assembly exceeds the pre-set bias of the biasing means, the opening is unblocked and pressure is released.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
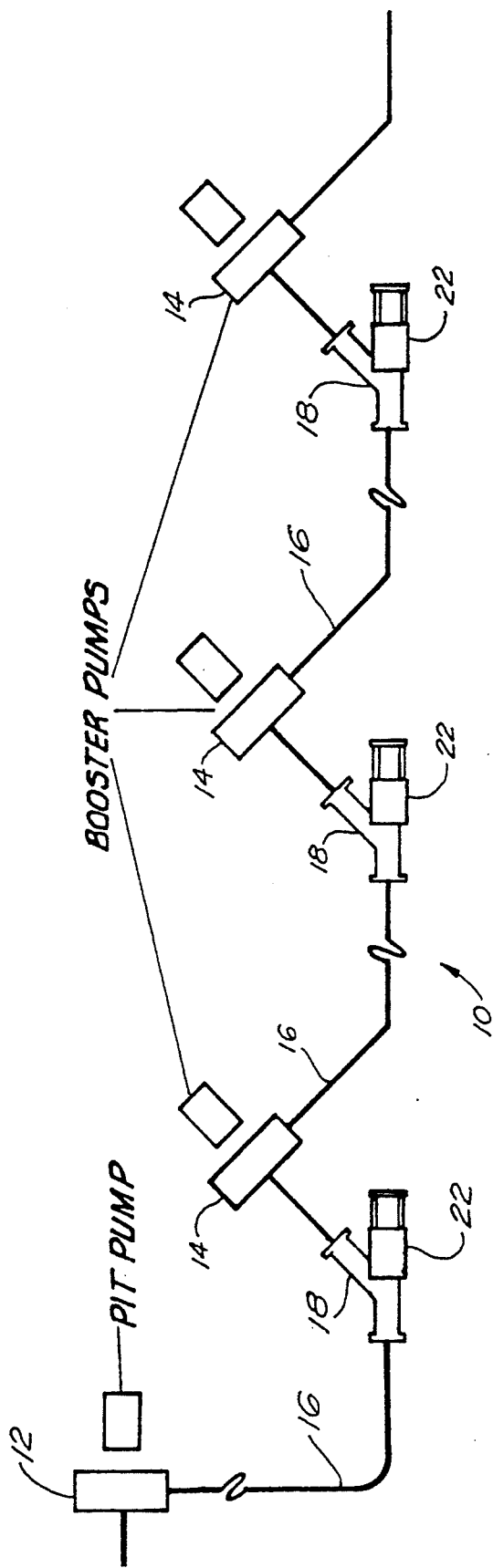
FIG. 1 is a pictorial view of a suggested installation of the invention.

Referring initially to FIG. 1, there is shown a suggested matrix pumping system 10. This system 10 comprises an initial pit pump 12 and intermediate booster pumps 14 (only three (3) are shown, but of course, more are often employed) connected by pipeline 16 (all valves or other control mechanisms are not shown for clarity). Such a system 10 is required when attempting to convey a fluid or slurry over long distances.

Figure 2:
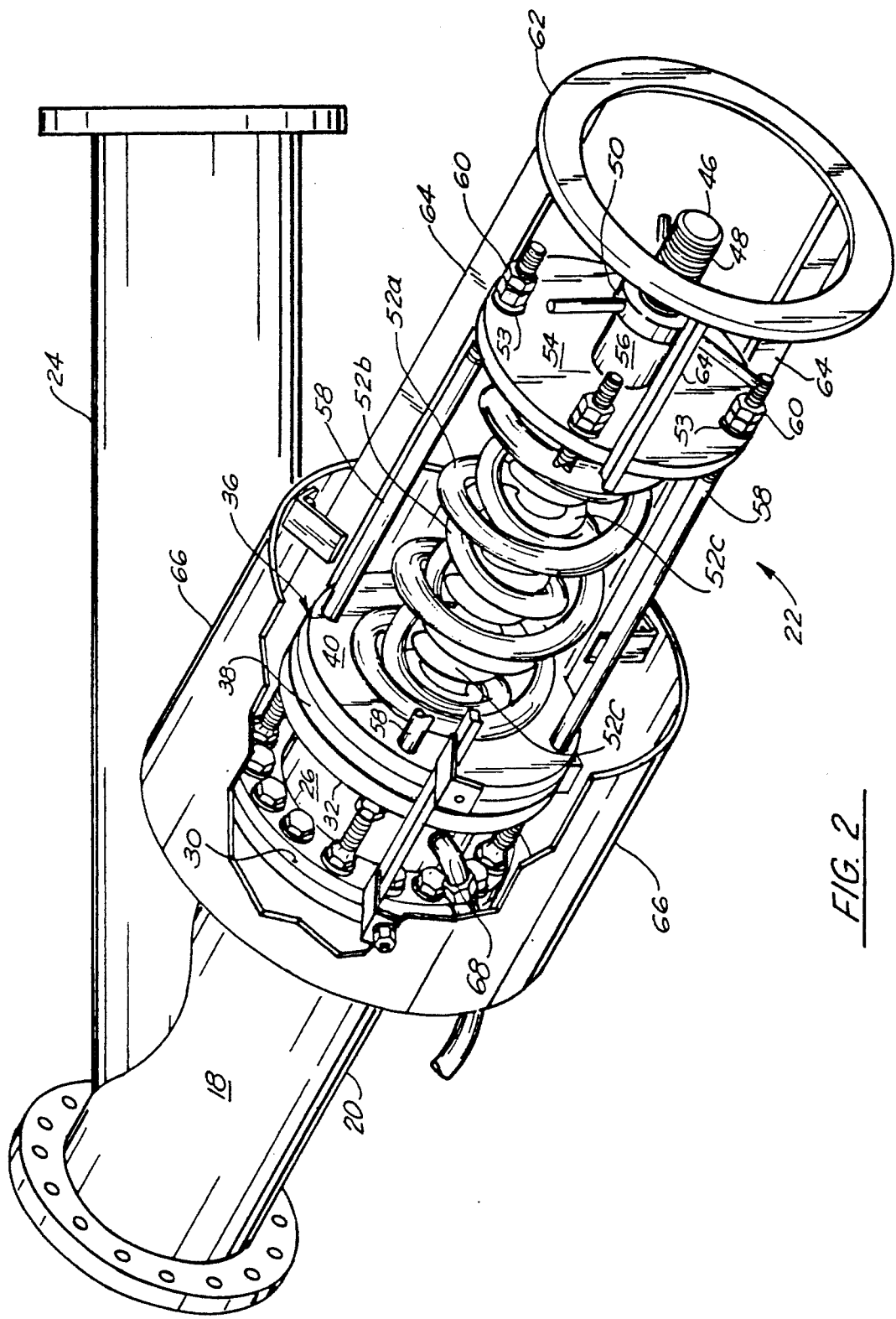
FIG. 2 is a pictorial view of the preferred embodiment of the apparatus of the present invention, partially broken away to reveal greater detail.

Located immediately prior to each booster pump 14 is fitting 18, such as a "Y" or lateral fitting or the like, which is secured to pipeline 16 in the normal fashion. As best seen in FIG. 2, fitting 18 consists of in-line branch 20 being specially configured with pressure release apparatus 22. The other angled branch 24 of fitting 18 conveys or diverts the fluid or slurry in pipeline 16 to the respective downstream booster pump 14. This branch 24 is usually angled at about forty-five (45°) degrees from in-line branch 20, more or less. Thus, pressure release apparatus 22 is "in-line" with pipeline 16 while the downstream booster pump 14 is angled with respect to pipeline 16. In this fashion, the fluid within pipeline 16 and any pressure wave that may occur within pipeline 16 will directly impact upon pressure release apparatus 22.

Figure 4:
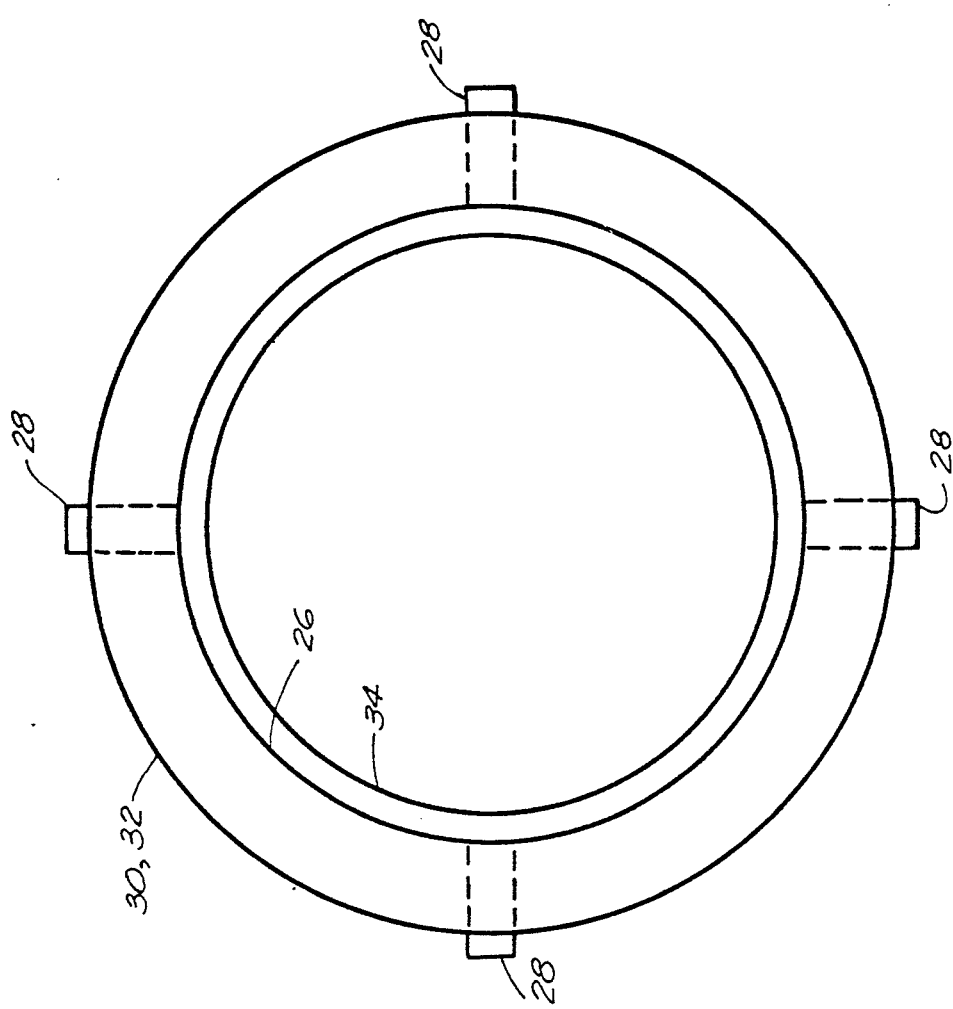
FIG. 4 is an axial view of the spool piece shown in FIG. 3.
Figure 3:
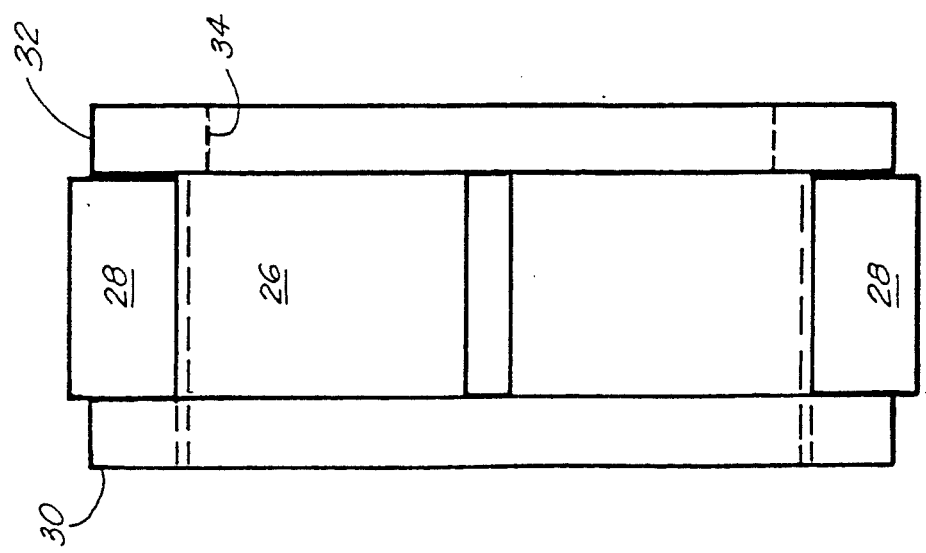
FIG. 3 is a side view of the spool piece forming a part of the preferred embodiment of the apparatus of the present invention.

As shown more clearly in FIGS. 2-4, pressure release apparatus 22 is secured to in-line branch 20 via spool piece 26 which is bolted or otherwise secured to in-line branch 20 in the normal fashion. To reinforce spool piece 26, a series of brace plates 28 extend axially along spool piece 26 between flanges 30 and 32. Generally, spool piece 26 is the same diameter as pipeline 16 so as not to impede the release of pressure from pipeline 16 when such becomes necessary.

Figure 6:
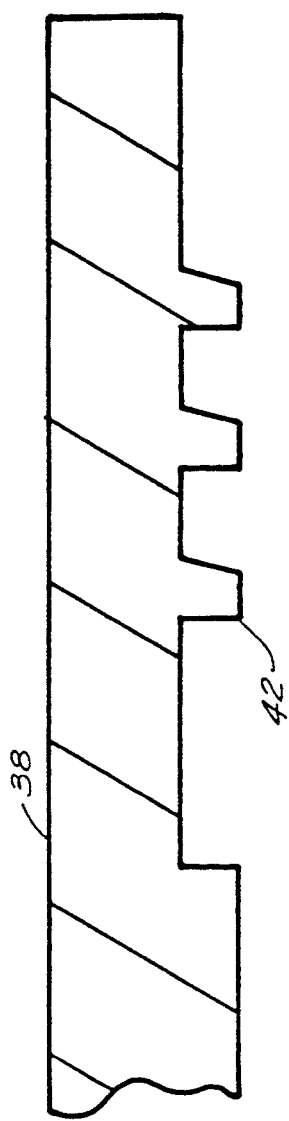
FIG. 6 is an enlarged pictorial view, partially broken away, of the seal between the face plate assembly and the spool piece.
Figure 5:
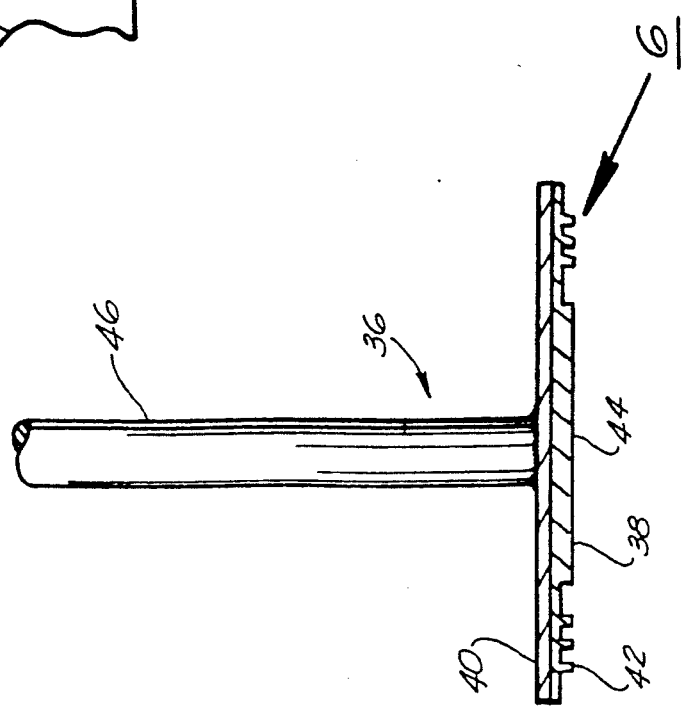
FIG. 5 is a pictorial view, partially broken away, of the face plate assembly of the preferred embodiment of the apparatus of the present invention.
Figure 8:
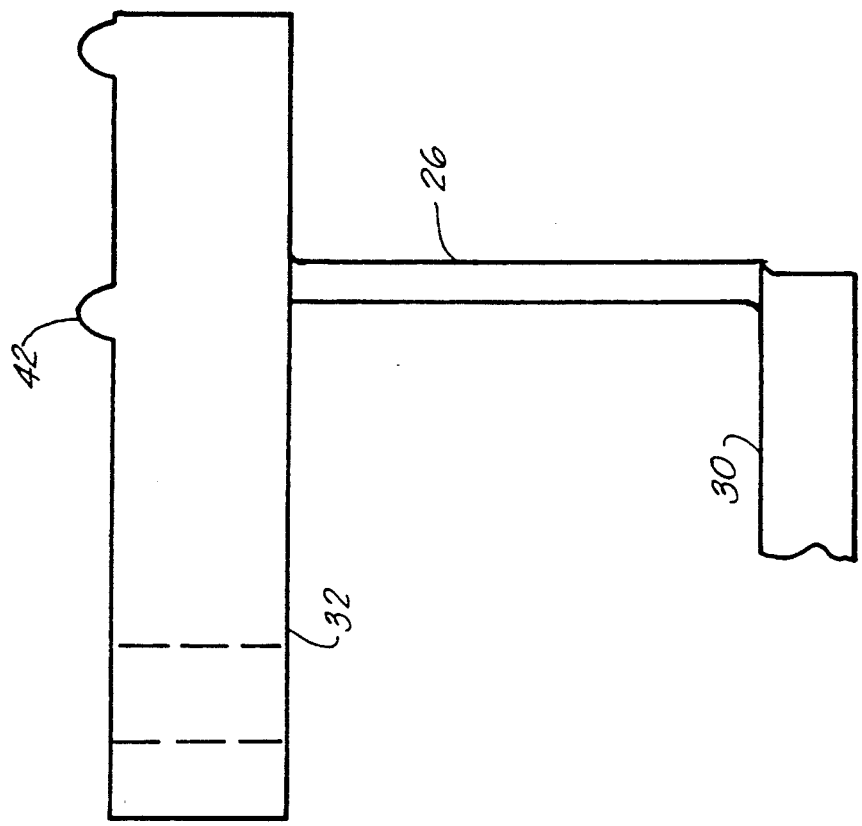
Figure 7:
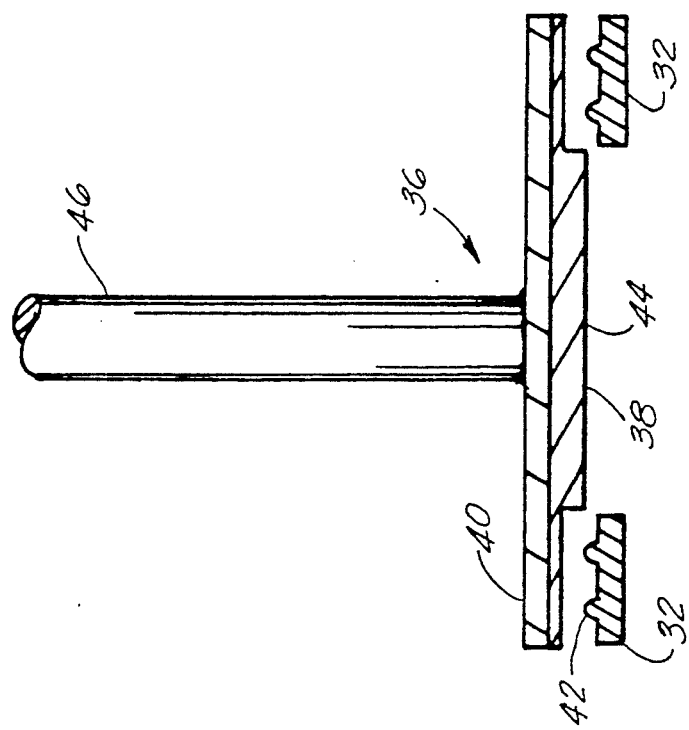
FIG. 7 is an alternate pictorial view, partially broken away, of an alternate face plate assembly of the invention; and, FIG. 8 is an enlarged pictorial view, partially broken away, of an alternate seal between the face plate assembly and the spool piece.

Covering or blocking opening 34 of spool piece 26 is face plate assembly 36. The preferred version of face plate assembly 36 is shown in FIGS. 5 and 6 while an alternate version of face plate assembly 36 is illustrated in FIGS. 7 and 8. Other versions are equally likely. Face plate assembly 36 consists of seal 38, such as compressible urethane or rubber, which is attached to face plate 40. This seal 38 is biased or compressed against flange 32 of spool piece 26 thereby completely covering or blocking opening 34 until such bias is overcome by the pressure within pipeline 16.

In FIGS. 5 and 6, seal 38 attached to face plate 40 is configured with a series of ridges 42 along its outer periphery that will engage and seal against flange 32 when the two are compressed together. The center region 44 of seal 38 is thicker as shown and is configured to fit within (and thereby block) opening 34 of spool piece 26.

In the alternate version illustrated in FIGS. 7 and 8, there are no ridges 42 along the outer periphery of seal 38, instead such ridges 42 are configured as a part of flange 32, preferably of steel. The central region 44 of seal 38 is still thicker as before, thus, when seal 38 and flange 32 are compressed together, the ridges 42 on flange 32 engage the outer periphery of seal 38 thereby effectively sealing opening 34 of spool piece 26.

As shown in FIGS. 2, 5, and 7, face plate assembly 36 is also configured with central shaft 46 that is secured to face plate 40. This shaft 46 is secured, such as by welding, to the side of face plate 40 opposite from seal 38 and it extends axially outward from in-line branch 20 and spool piece 26. Its end region 48 is threaded as shown in FIG. 2 such that nut 50 can be threaded thereon.

Located around shaft 46 are one or more springs 52, preferably concentric coil springs, which may vary in size and characteristics (three (3) concentric coils are shown in the preferred embodiment of FIG. 2). These springs 52a, 52b, 52c, when compressed in place, provide the biasing force which biases face plate assembly 36 against flange 32. Generally, there will be three such springs, each fitting either inside of or around the others, in order to develop the large biasing force required to resist the pressure within pipeline 16. However, nut 50 on the end of shaft 46 can be moved either inwardly or outwardly as needed to adjust this biasing force so that should the pressure within pipeline 16 exceed a certain level, springs 52 will be compressed thereby unblocking or unsealing opening 34 so that such pressure build-up can be released. (In an alternate embodiment, nut 50 need not be used and nuts 60 can be used to adjust the biasing force.)

As shown in FIG. 2, springs 52 are compressed between face plate 40 and stop plate 54. Stop plate 54 is configured with central collar 56 against which nut 50 is threaded. It is by the action of rotating nut 50 that stop plate 54 is moved thereby enabling the biasing force provided by springs 52 to be adjusted.

Stop plate 54 is also configured with a series of rod openings 53 through which threaded rods 58 extend. These threaded rods 58 pass through stop plate 54 as well as face plate 40 and flange 32 of spool piece 26. They are threaded at each end such that once the proper position of stop plate 54 is determined, nuts 60 can be threaded thereon at both ends to hold and secure stop plate 54 in place. Threaded rods 58 also maintain the proper alignment of shaft 46 and stop plate 54 so that the tremendous force of springs 52 do not cause them to become skewered.

Beyond nut 50 and end region 48 of shaft 46 is circular guard 62 which protects nut 50 and end region 48 from damage. Circular guard 62 is supported by members 64 which are, in turn, supported by blast shield 66.

Blast shield 66, which is partially cut away in FIG. 2, completely surrounds seal 38 as well as flange 32 and face plate 40. The purpose of blast shield 66 is to deflect the significant blast of fluid that will be expelled from pipeline 16 whenever pressure builds up enough to cause springs 52 to be compressed thereby opening up seal 38. Blast shield 66 protects any surrounding people or equipment from such pressure release and deflects such blast axially along in-line branch 20. Blast shield 66 is secured to spool piece 26 such as by brackets or the like. Within blast shield 66 is purge line 68 which aids in purging any fluid from inside spool piece 26 or in dislodging any item that may be covering or blocking the entrance to spool piece 26.

During operation of pumping system 10, the various pumps 12 and 14 will normally be activated to convey the fluid within pipeline 16. Should pressure build up anywhere along pipeline 16, such as by closing or opening a valve or by one pump not being in synchronization with the others, this pressure increase may cause a water hammer to occur. In this event, and should the pressure be significant enough to cause damage to the system 10, such pressure will need to be relieved as quickly as possible in order to avoid such damage. This is accomplished by pressure release apparatus 22 which is only activated when the pressure build-up meets or exceeds a certain preset level.

As soon as the pressure within pipeline 16 meets or exceeds this preset level, this pressure pushing against face plate 40 will cause springs 52 to compress thereby unblocking opening 34 of spool piece 26. Immediately upon such unblocking, the pressurized fluid within spool piece 26 will burst forth since it is now released to the atmosphere. However, once the pressure against face plate 40 falls below that of the biasing force of springs 52, these springs 52 will immediately cause opening 34 to again become blocked. This cycle will repeat itself over again each time the bias of springs 52 is overcome. Thus, setting the bias of springs 52 to a level just below that needed to cause damage to pumping system 10 will insure that no damage occurs and that there will be no unnecessary loss of fluid from system 10.

Because it is anticipated that the pressure within pipeline 16 will be significant and that any release of such pressure will be without any forewarning and will be explosive, blast shield 66 is installed around pressure release apparatus 22 to protect nearby people and property from any damage that might otherwise occur. Blast shield 66 deflects any such blast of pressure along in-line branch 20 to minimize any such potential hazard. It is also recommended that an earth berm be installed around pressure release apparatus 22 to further protect from harm.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A pipeline pressure release apparatus for positioning in a pipeline conveying fluid subject to pressure build up, comprising:
    (a) a first branch in angular relation, commencing at its first end portion, to said pipeline for diverting fluid flow, and;
    (b) a second branch which at its first end portion is substantially in line with said pipeline for directing the movement of pressure build up surges from said pipeline, said second branch having provided at its other end portion;
        (i) a spool piece connected to the pipeline, said spool piece having an opening therethrough sized substantially equal to the diameter of said pipeline for pressure release and venting to the atmosphere;
        (ii) face plate means secured on one of its surfaces to said spool piece and movable to a first position for normally blocking said opening in said spool piece;
        (iii) means applied against the other surface of said face plate for biasing said face plate means against any force created by pressure build up surges in said pipeline to said first position against said spool piece, thereby blocking said opening in said spool piece;
        (iv) means for adjusting the bias of said biasing means, said biasing means being positioned intermediate said face plate means and said adjustment means, and, whereby when the force created by pressure against said face plate means exceeds the bias of said biasing means, said opening is unblocked by movement of said face plate means to a second position and pressure is released through said other end portion of said second branch; and,
        (v) a blast shield surrounding at least a portion of said spool piece and a portion of said face plate means, said blast shield configured to deflect said pressure build up surges released from said pipeline when said opening is unblocked.

2. The apparatus as set forth in claim 1 wherein said spool piece is secured to a lateral flange secured to the pipeline.

3. The apparatus as set forth in claim 1 wherein said biasing means comprise coil spring means for biasing said face plate means against said spool piece.

4. The apparatus as set forth in claim 3 wherein said spring means comprise a plurality of concentric coil springs.

5. The apparatus as set forth in claim 4 wherein said adjustment means further comprises a movable stop plate against one surface of which said spring means are biased.

6. The apparatus as set forth in claim 5 wherein said adjustment means further comprises: a threaded shaft secured to said other surface of said stop plate means along which said stop plate is movable; and, retaining means threadable upon said threaded shaft for moving said stop plate and retaining said stop plate in a selected position.

7. The apparatus as set forth in claim 6 further comprising means for sealing positioned between said spool piece and said face plate means.

8. The apparatus as set forth in claim 7 wherein said sealing means comprise a compressible material, optionally rubber or urethane.

9. The apparatus as set forth in claim 8 wherein said sealing means further comprise ridge means intermediate said spool piece and said face plate means for sealing between the two.

10. The apparatus as set forth in claim 9 wherein said ridge means forms a part of said compressible material.

11. The apparatus as set forth in claim 9 wherein said ridge means form a part of said spool piece and engage said compressible material.

12. A method of relieving pressure from within a pipeline system conveying fluid subject to pressure build up surges comprising the steps of:
(a) providing said pipeline system with a primary pump and a plurality of booster pumps downstream thereof;
(b) providing upstream of each of said booster pumps a pressure relief apparatus in the pipeline, said pressure relief apparatus having:
　(i) a first branch in angular relation, commencing at its first end portion, to said pipeline for diverting fluid flow, and;
　(ii) a second branch which at its first end portion is substantially in line with said pipeline for directing the movement of pressure build up surges from said pipeline, said second branch having provided at its other end portion a spool piece secured to the pipeline, said spool piece having an opening therethrough sized for pressure release and venting to the atmosphere;
(c) installing a face plate assembly across said opening, said face plate assembly being sized and configured, and movable to a first position, to block said opening;
(d) biasing said face plate assembly against any force created by pressure build up surges in said pipeline to said first position, said spool piece thereby blocking said opening;
(e) adjusting the bias of said face plate assembly against said spool piece, whereby when the force created by pressure build up surges against said face plate assembly exceeds said preselected bias, said opening is unblocked and pressure is released; and,
(f) surrounding at least a portion of said spool piece and a portion of said face plate assembly with a blast shield, said blast shield being configured to deflect said pressure build up surges released from the pipeline when said opening is unblocked.

13. The method as set forth in claim 12 further comprising the step of securing said spool piece to a lateral flange secured to the pipeline.

14. The method as set forth in claim 12 further comprising the step of biasing said face plate assembly with at least one coil spring.

15. The method as set forth in claim 14 further comprising the step of supplying a movable stop plate against which said coil spring is biased, said movable stop plate being movable along a threaded shaft secured to said face plate assembly and upon which a retainer is threaded for moving said stop plate and retaining said stop plate in a selected position.

16. The method as set forth in claim 15 further comprising the step of sealing between said spool piece and said face plate means with sealing means comprising a compressible material.

17. The method as set forth in claim 16 further comprising the step of sealing, with sealing means having at least one ridge, intermediate said spool piece and said face plate assembly.

* * * * *